US007926035B2

(12) United States Patent
Musuvathi et al.

(10) Patent No.: US 7,926,035 B2
(45) Date of Patent: Apr. 12, 2011

(54) TESTING MULTI-THREAD SOFTWARE USING PRIORITIZED CONTEXT SWITCH LIMITS

(75) Inventors: Madanlal S. Musuvathi, Redmond, WA (US); Shaz Qadeer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 11/739,427

(22) Filed: Apr. 24, 2007

(65) Prior Publication Data

US 2008/0271042 A1   Oct. 30, 2008

(51) Int. Cl.
*G06F 9/44* (2006.01)
*G06F 9/445* (2006.01)

(52) U.S. Cl. .......................... 717/124; 717/125; 717/149

(58) Field of Classification Search .......... 717/124–129, 717/149–151
See application file for complete search history.

(56) References Cited

U.S. PATENT DOCUMENTS

| | | | |
|---|---|---|---|
| 5,179,702 A * | 1/1993 | Spix et al. ...................... | 718/102 |
| 5,442,797 A * | 8/1995 | Casavant et al. ............... | 717/149 |
| 5,692,193 A * | 11/1997 | Jagannathan et al. ........ | 718/106 |
| 5,729,710 A * | 3/1998 | Magee et al. .................. | 711/203 |
| 6,158,045 A * | 12/2000 | You ................................. | 717/124 |
| 6,212,544 B1 | 4/2001 | Borkenhagen et al. | |
| 6,282,701 B1 * | 8/2001 | Wygodny et al. ............. | 717/125 |
| 6,374,286 B1 * | 4/2002 | Gee et al. ....................... | 718/108 |
| 6,567,974 B1 * | 5/2003 | Czajkowski ................... | 717/151 |
| 6,697,935 B1 | 2/2004 | Borkenhagen et al. | |
| 6,748,556 B1 | 6/2004 | Storino et al. | |
| 6,779,135 B1 | 8/2004 | Ur et al. | |
| 6,851,075 B2 | 2/2005 | Ur et al. | |
| 6,854,108 B1 * | 2/2005 | Choi .............................. | 717/125 |
| 6,883,162 B2 * | 4/2005 | Jackson et al. ................ | 717/124 |
| 6,938,247 B2 * | 8/2005 | Czajkowski ................... | 717/151 |
| 6,952,825 B1 * | 10/2005 | Cockx et al. .................. | 718/102 |
| 6,971,084 B2 * | 11/2005 | Grey et al. ..................... | 717/106 |
| 6,978,399 B2 * | 12/2005 | Bates et al. ...................... | 714/34 |
| 7,222,264 B2 * | 5/2007 | Muratori et al. ................. | 714/35 |
| 7,293,251 B2 * | 11/2007 | Zeman et al. ................. | 717/100 |
| 7,373,640 B1 * | 5/2008 | English et al. ................ | 717/149 |
| 7,386,864 B2 * | 6/2008 | Richardson ................... | 719/321 |
| 7,415,704 B2 * | 8/2008 | Schmidt et al. ............... | 717/166 |
| 7,426,731 B2 * | 9/2008 | Findeisen ...................... | 718/104 |
| 7,559,060 B2 * | 7/2009 | Schmidt et al. ............... | 718/100 |
| 7,617,488 B2 * | 11/2009 | Srinivasan et al. ............ | 717/130 |

(Continued)

OTHER PUBLICATIONS

Cui et al, "Extending data prefetching to cope with context switch misses", IEEE, pp. 260-267, 2009.*

(Continued)

*Primary Examiner* — Anil Khatri
(74) *Attorney, Agent, or Firm* — Workman Nydegger

(57) ABSTRACT

Testing multithreaded application programs for errors can be carried out in an efficient and productive manner at least in part by prioritizing thread schedules based on numbers of context switches between threads therein. In particular, each thread schedule in a multithreaded application program can be prioritized based on whether a given thread schedule has the same as or less than some maximum value. A model checker module can then iteratively execute thread schedules that fit within a given context switch maximum value, or a progressively higher value up to some limit. In one implementation, for example, the model checker module executes all thread schedules that have zero preempting context switches, then all thread schedules that have only one preempting context switch, etc. Most errors in an application program can be identified by executing only those thread schedule with relatively few preempting context switches.

17 Claims, 3 Drawing Sheets

U.S. PATENT DOCUMENTS

| | | | | |
|---|---|---|---|---|
| 7,657,880 | B2* | 2/2010 | Wang et al. | 717/149 |
| 7,685,599 | B2* | 3/2010 | Kanai et al. | 718/104 |
| 7,712,080 | B2* | 5/2010 | Pan et al. | 717/119 |
| 7,730,291 | B2* | 6/2010 | Kissell | 712/244 |
| 7,831,961 | B1* | 11/2010 | Bush et al. | 717/124 |
| 2004/0230961 | A1 | 11/2004 | Biberstein et al. | |
| 2006/0130010 | A1 | 6/2006 | Rehof et al. | |
| 2006/0218534 | A1 | 9/2006 | Kahlon et al. | |

OTHER PUBLICATIONS

Kumar et al, "Asynchronous software thread integartion for efficient software implementations of embedded communication protocol controllers", ACM LCTES, pp. 37-46, 2004.*

Xian et al, "Allocation phase aware therad scheduling policies to improv garbage collection performance", ACM ISMM, 79-90, 2007.*

Feng et al, "Certifying low level programs with hardware interrupts and preemptive threads", ACM PLDI, pp. 170-182, 2008.*

"CHESS: Systematic Stress Testing of Concurrent Software," by Madan Musuvathi and Shaz Qadeer, date unknown, Microsoft Research, [online] [retrieved on Feb. 13, 2007], 2 pgs. Retrieved from the Internet: http://research.microsoft.com/projects/CHESS/chess.pdf.

"Context-Bounded Model Checking of Concurrent Software," by Shaz Qadeer and Jakob Rehof, date unknown, Microsoft Research, [online] [retrieved on Feb. 13, 2007], 15 pgs. Retrieved from the Internet: http://ls14-www.cs.uni-dortmund.de/ls14Medien/Dokumente/Pubs/Context-Bounded.pdf.

"Model Checking Multithreaded Programs with Asynchronous Atomic Methods," by Koushik Sen and Mahesh Viswanathan, date unknown, Department of Computer Science, University of Illinois at Urbana-Champaign, [online] [retrieved on Feb. 13, 2007], 14 pgs. Retrieved from the Internet: http://osl.cs.uiuc.edu/~ksen/paper/multiset.ps.

"Integrated State Space Reduction for Model Checking Executable Object-oriented Software System Designs," by FEI Xie and James C. Browne, date unknown, Department of Computer Sciences, University of Texas at Austin, [online] [retrieved on Feb. 13, 2007], 15 pgs. Retrieved from the Internet: http://citeseer.ist.psu.edu/cache/papers/cs/30215/http:zSzzSzwww.cs.utexas.eduzSzuserszSzbrownezSzNewPaperszSzissr-fase2002.pdf/intergrated-state-space-reduction.pdf.

* cited by examiner

TESTING MULTI-THREAD SOFTWARE USING PRIORITIZED CONTEXT SWITCH LIMITS

CROSS-REFERENCE TO RELATED APPLICATIONS

N/A

BACKGROUND

Background and Relevant Art

As computerized systems have increased in popularity, so have the complexity of the software and hardware employed within such systems. In general, there are a number of reasons that drive software and hardware changes for computerized systems. For example, as hardware capabilities improve, software often needs to change to accommodate new hardware requirements. Similarly, as software becomes more demanding, a similar effect occurs that can push hardware capabilities into new ground. In addition to these reciprocating push forces, end-users continue to demand that software and hardware add convenience by improving automation of certain tasks or features, or by adding automation where none previously existed.

For at least these reasons, software is continually being developed. In some cases, new software programs are written entirely from scratch, while in other cases, some software programs continue through ongoing, incremental updates. Developing software, however, is not a simple matter. In particular, software development typically involves not only the creation of executable code, but also extensive testing techniques to ensure that the executable code works on a variety of platforms, in a variety of settings, and in response to a variety of different tasks. It is not surprising, therefore, that there are large numbers of mechanisms devoted entirely for testing purposes.

In general, testing software involves identifying a set of interactions with a particular program, as well as expected permutations of the same, and executing the interactions to determine if the new software is capable of running as intended. Of course, such an ideal is rarely possible, particularly with large, complex programs that may have hundreds and thousands of possible permutations of use through various user interfaces, and so on. This is particularly true of multi-threaded applications, such as operating system programs, which may have several different sequences that can occur at a time.

In general, a "thread" includes a set of zero or more steps that can (or are required to) be executed in sequence. For example, a simplistic version of a "copy" thread could include a step ("A1") of receiving a user selection of an "edit" menu item in a user interface, and a step ("A2") of receiving a selection for a copy command on the menu item. If, in this example, the copy thread were set up so that each step in the thread had to be executed in turn before the thread were completed (requiring "A1" and "A2" to occur with no interruption), the thread might be thought to have no "context switches," or switches to enable execution of a "different" thread before finishing the copy thread.

In any event, assuming that the above-mentioned "different" thread also includes two different steps "B1" and "B2," and further assuming that the above-mentioned "copy" thread could be switched to the different thread, execution of the example copy thread and the different thread would be said to have at least one context switch. Furthermore, if all of the steps in both threads could be paused to switch to the other thread during execution, then the copy thread and the different thread could be thought of as sharing as many as three different context switches (e.g., A1 switching to B1, B1 switching to A2, and A2 switching to B2).

Thus, if a tester were to test the above-mentioned copy thread and different thread of the program together to ensure interoperability, the tester might need to test the permutation of both threads that involved all three context switches. Of course, conventional programs can have threads that approach several tens or hundreds of different steps, as well as several different context switches therebetween. One will appreciate that this can significantly increase the number of possible tests that might need to be performed. The magnitude of this number can be illustrated by the following.

Suppose "P" is a terminating multithreaded program, where program P has "n" threads, and each thread executes at most "k" steps. In such a case, the total number of executions of P could be greater than or equal to $(n!)^k$, a dependence that is exponential in both n and k. One can appreciate, therefore, that testing even small numbers of context switch permutations between different conventional threads that may employ a hundred (e.g., $(2!)^{100}$) steps could take a very long time without even approaching all possible test states.

As such, software testers will typically test software using a variety of different mechanisms that can be generally characterized as "stress testing," and/or "model checking." For example, "stress testing" involves executing a program under heavy loads with the hope of producing an erroneous interleaving between threads. Stress-testing, however, does not provide any notion of coverage with respect to concurrency; even after executing the tests for days, the fraction of explored, concurrent thread schedules remains unknown (and likely very low).

By contrast, "model checking" includes systematic exploration of program behavior. A model checker, however, though attempting to maintain desired properties of the multi-threaded program, is incapable of handling the "state explosion" common with multithreaded applications. That is, as described above, each thread in a multithreaded program can have several different context switches, which yields a large number of possible states to be systematically explored. Some conventional modifications to these techniques that attempt to accommodate state explosion include "partial-order reduction," and "symmetry reduction." Reduction techniques such as these, however, are incapable of fully exploring the behaviors of large programs within reasonable resources of memory and time.

Thus, these heuristics are sometimes coupled with certain restrictions, such as "depth-bounding," which limits execution to certain threads of predetermined size (i.e., numbers of steps), or cuts off execution of a thread after a predetermined number of steps. Of course, modifications such as depth-limited searching rely on identifying bugs early on in a thread, or identifying bugs in relatively small threads, which is not always a reasonable assumption. In particular, conventional depth-bounding techniques do not work well with larger, more complex programs where several orders of magnitude more steps may be needed to identify bugs in the thread.

Accordingly, there are a number of difficulties associated with testing multi-threaded programs that can be addressed.

BRIEF SUMMARY

Implementations of the present invention provide systems, methods, and computer program products configured to test multithreaded applications in an efficient and productive manner. In particular, implementations of the present invention provide one or more mechanisms for finding a relatively high number of potential execution errors using a comparatively minimal set of resources. For example, at least one implementation of the present invention involves iteratively prioritizing testing of thread schedules with few or zero context switches between threads therein, and progressively testing thread schedules up to a predetermined maximum context switch value for each thread schedule.

For example, a method in accordance with an implementation of the present invention for prioritizing thread schedule execution based on context switch values can involve identifying a context switch value for each of a plurality of thread schedules in a multithreaded application, where at least some of the plurality of thread schedules include threads that are configured to execute concurrently. The method can also involve identifying a context switch maximum value. In addition, the method can involve determining which of the identified context switch values corresponding to each of the plurality of thread schedules is within the identified context switch maximum value. Furthermore, the method can involve creating a work queue comprising only those thread schedules corresponding to the determined context switch values within the context switch maximum value.

In addition (or in the alternative), a method of executing thread schedules that are prioritized based on context switch values can involve receiving a set of program code of a multithreaded application program. In this case, the program code is closed. The method can also involve executing each thread schedule in an initial set of one or more thread schedules that correspond to a first context switch maximum value. Generally, each possible state for each thread schedule in the initial set is determined. In addition, the method can involve, upon completing execution of each thread schedule in the initial set, executing each thread schedule in a subsequent set of one or more thread schedules that correspond to a second context switch maximum value. Similarly, each possible state for each thread schedule in the initial set is also determined in this case. Furthermore, the method can involve generating at least one error report that correlates all possible errors within one or both of the first or second context switch maximum values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
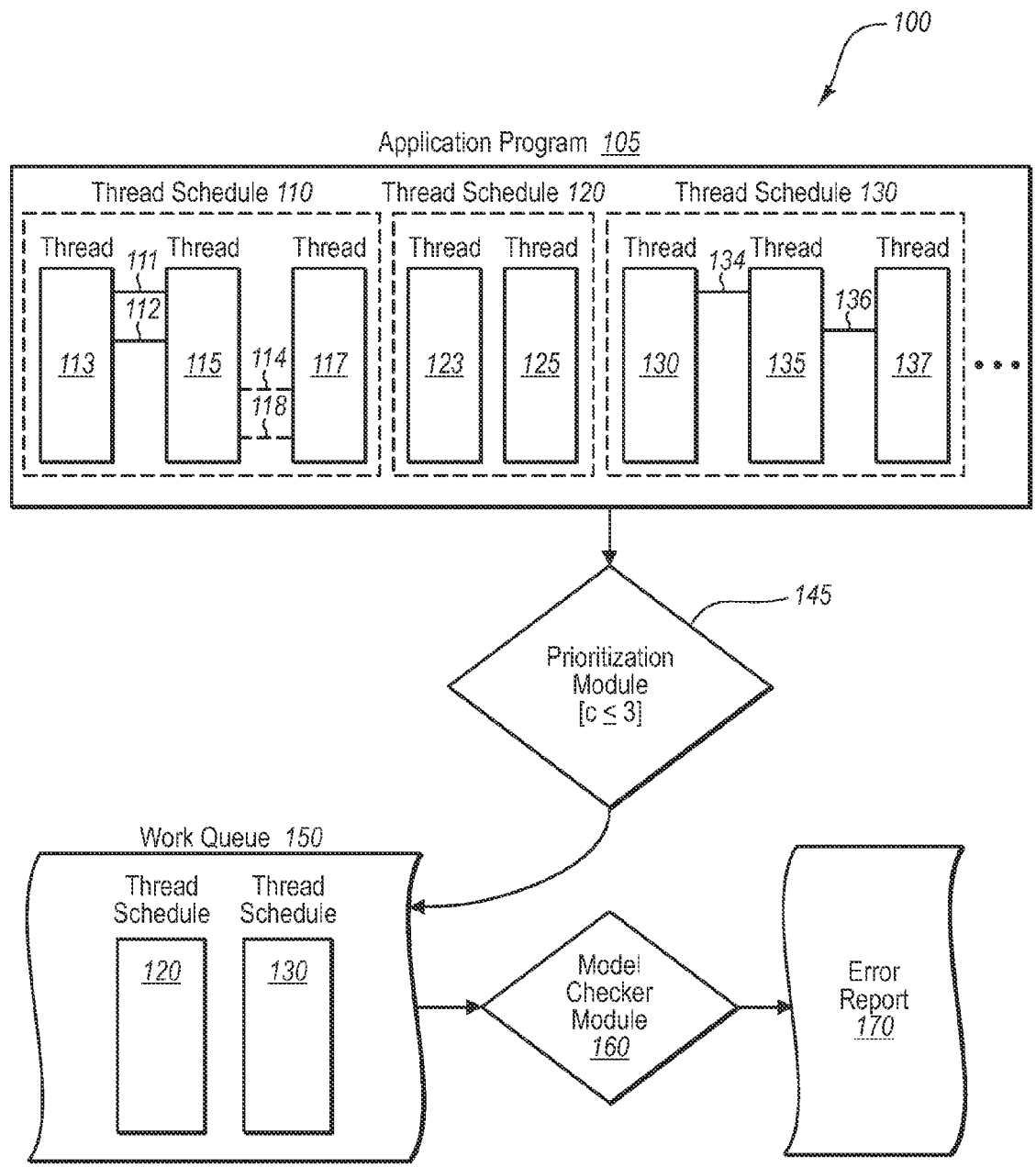
FIG. 1 illustrates an overview schematic diagram in accordance with an implementation of the present invention, in which a multithreaded application program is tested through a model checker module.

Implementations of the present invention extend to systems, methods, and computer program products configured to test multithreaded applications in an efficient and productive manner. In particular, implementations of the present invention provide one or more mechanisms for finding a relatively high number of potential execution errors using a comparatively minimal set of resources. For example, at least one implementation of the present invention involves iteratively prioritizing testing of thread schedules with few or zero context switches between threads therein, and progressively testing thread schedules up to a predetermined maximum context switch value for each thread schedule.

In particular, and as will be understood more fully from the following specification and claims, implementations of the present invention, which include "iterative context bounding" provide a number of unexpected advantages in testing multithreaded applications. At least one of these advantages involves the ability to effectively search an unexpectedly high amount of the state space of a multithreaded program despite a relatively restricted set of resources (e.g., memory, time, processing power, etc.) In addition, many subtle bugs can be found in executions of thread schedules (comprising one or more threads) that have relatively small numbers of context switches between the threads in the thread schedule.

As will also be understood more fully herein, for a given context-bound "c" (i.e. context switch maximum), an algorithm in accordance with at least one implementation of the present invention can be configured to execute only those thread schedules in which the number of context switches (e.g., preempting) between threads is at most c. Unlike conventional depth-bounding algorithms, bounding the context switches for a given thread schedule, rather than necessarily just the depth, can allow execution of an arbitrary number of steps in a thread between context switches. That is, bounding the context switches for a thread schedule can allow more robust testing of corresponding state space, particularly for thread schedules (regardless of depth) with a small number of context switches between threads. In particular, a test can be configured to execute all thread schedules with a context-bound of "0" to completion.

In general, limiting execution of thread schedules based on the number of context switches per thread schedule, rather than depth-bounds alone, means that the total number of executions in a program can be polynomial in the number of steps taken by each thread. This has implications both to small and large multithreaded programs alike. For example, a theoretical upper-bound makes it feasible to test or explore large programs without sacrificing the ability to go deep in the state space. Furthermore, many nontrivial concurrency bugs can still be found in small programs despite searching only those thread schedules with a relatively small number of context switches between threads therein. As such, when faced with limited resources, focusing on the polynomially-bounded (and potentially bug-yielding) executions with a small context-switch bound can be a productive search strategy for searching large and small programs alike.

Furthermore, iterative context-bounding can simplify explanations for an error. In particular, errors can be uncovered using the smallest number of context-switches exposing the error. This also means that when the search runs out of resources (after exploring all executions with c context-switches), any error subsequently found in the program can be isolated to errors produced from thread schedules having at least "c+1" context switches between threads. Thus, in addition to providing a valuable coverage metric, implementations of the present invention can also provide a programmer with an estimate of the complexity of bugs remaining in the system, and the probability of their occurrence in practice.

Referring now to the Figures, FIG. 1 illustrates an overview schematic diagram for testing a multithreaded application program using context-switch value limits for thread schedules. As shown, a computerized environment 100 can include a multithreaded application program 105. Application program 105, in turn, also comprises a plurality of thread schedules 110, 120, and 130, each of which further includes one or more threads (113, 115, 117, 123, 125, 133, 135, and 137). Each thread, in turn, includes one or more steps (not shown) for accomplishing a particular action. As previously described, for example, one thread schedule (e.g., 110) might include a thread 113 having a series of steps used to copy text in a user interface, while another thread 115 in this thread schedule might include a series of steps used to run a clock in the background, or to receive and process a key stroke. In any case, the illustrated thread schedules (110, 120, and 130) include threads that can be executed concurrently, or at the same time.

FIG. 1 also illustrates each of these thread schedules includes a particular execution sequence of threads (reading from left to right), though one will appreciate that virtually any sequence of executions may be possible between threads in any given thread schedule. For example, as viewed from left to right, FIG. 1 shows that that this particular execution sequence executes all possible steps and corresponding context switches between threads 113, 115, and 117 of thread schedule 110, then all possible steps of threads 123 and 125 in thread schedule 120, and so on. Thus, in this example, thread schedule 110 has four possible context switches (111, 112, 114, 118) between threads 113, 115, and 117, while thread schedule 120 has zero context switches, and thread schedule 130 has two context switches (134, 136) between threads 130, 135 and 137.

For simplicity in explanation, each of these context switches between particular threads in a thread schedule can be either "preempting" or "non-preempting." As previously described, a preempting context switch is one that requires switching from one thread to another thread, though the one thread may still be in the mode of executing one or more steps. For example, the other thread (to which the execution is switched) may require execution due to a timer function, or for some other reason, and cannot wait until the initial thread has completed execution of steps. For example, any thread with a set of commands for executing a letter key (e.g., "e") on a keyboard could be considered preempting. Thus, when a user depresses a letter key, the key is received and displayed, regardless of what other threads may be running at the same time. That is, at least one of the steps in the letter key thread schedule execution preempts execution of a non-preempting step in another thread schedule execution.

In any event, implementations of the present invention include mechanisms for identifying the number of context switches between threads in any given thread schedule; and, in at least one implementation, identifying in particular the number of preempting context switches per thread schedule. This can be done any number of ways. FIG. 1, however, shows that thread schedules 110, 120, and 130 of application program 105 are at least partially processed via prioritization module 145. In particular, prioritization module 134, which comprises any set(s) of computer-executable instructions, scans each of these thread schedules to determine the number of possible context switches per thread schedule, and to thus assign a context switch value to each thread schedule. How prioritization module 135 counts and assigns this context switch value for each given thread schedule can be varied by the tester.

As previously mentioned, a tester can also indicate the context switch maximum number ("c") that is used in prioritizing the testing of thread schedules. The tester can also indicate the types of context switches that can be used as part of this count. As previously mentioned, for example, the tester can indicate that the context switch maximum number represents only preempting context switches, only non-preempting context switches, or that the context switch maximum represents both preempting and non-preempting context switches. As discussed more fully herein, the tester can further indicate one or more depth limitations, if desired.

In any case, prioritization module 145 receives these values from a tester (or an automated component) and reviews each thread schedule for a context switch count. In particular, prioritization module 145 determines which of thread schedules 110, 120, and 130 fit within the defined parameters with regard at least to the context switch maximum value. Prioritization module 145 can then create an ordered or prioritized execution schedule. For example, FIG. 1 shows that prioritization module 145 creates an initial work queue 150, which includes in this case those thread schedules that have three or fewer context switches (i.e., "c≦3"). Specifically, prioritization module 145 determines that thread schedules 120, and 130 include three or fewer context switches in their sets of threads. Of course, higher or smaller context switch maximum values than that illustrated can be appropriate in any number of different situations.

In any case, upon creating the schedule/work queue, prioritization module 145 can feed work queue 150 to model checker module 160 for processing. In one implementation, for example, model checker module 160 processes each thread schedule 120 and 130 all the way to completion, which includes reproducing all possible states between the threads in each thread schedule through any context switching during execution. Upon encountering any errors, model checker module 160 passes any identified errors to a corresponding error report 170, which enumerates where and how the errors were encountered, including the parameters under which work queue 150 was produced. For example, error report 170 can include information regarding that work queue 170 was based on thread schedules having three or fewer context switches (i.e., "c≦3"), and that those context switches were all preempting context switches.

One will appreciate, however, that model checker module 160 can also execute work queue 150 in context with any other parameters, such as depth-search parameters. As previously mentioned, for example, a tester can also indicate—whether to prioritization module 145 or to model checker module 160—that thread schedules having threads of a certain length should not be executed, or that execution should not proceed beyond certain thread lengths/steps within a given thread schedule. This can be at least one additional way to conserve testing resources while testing application program 105 in system 100. Nevertheless, one will appreciate that at least one advantage provided by implementations of the present invention is that adequate state coverage can be obtained without necessarily having to limit depth of search.

In any event, a tester can set up a given test for iteratively executing thread schedules corresponding to progressively larger context switch values. For example, prioritization module 145 can create an initial work queue for each thread schedule that has zero context switches between threads, and then create subsequent work queues for thread schedules having context switch values (e.g., preempting context switches, non-preempting context switches, or both) of one, two, and three, etc. Prioritization module 145 can then iteratively feed each of these work queues to model checker module 160. Alternatively, prioritization module 145 can provide a complete, ordered set of all thread schedules that fit within a particular maximum context switch value (e.g., all thread schedules having a "c" value of three or less).

Model checker module 160 can then iteratively execute each thread schedule in the progressive order (i.e., as determined by context switch value, rather than any specific ordering between thread schedules). For example, model checker module 160 can execute all thread schedules in a work queue (e.g., 150) that have no context switches between threads (e.g., 120), then all thread schedules that have one context switch between threads, and so forth, until the provided work queue is complete, or until some other predetermined value has been satisfied.

Iterative context switch bounding, however, need not necessarily be limited to processing thread schedules all of the same context switch value. For example, model checker module 160 can be instructed to process iterative ranges of thread schedules, such as all thread schedules with context switch values between zero and two (e.g., 120, 130), then all thread schedules with context switch values between two and four (e.g., including 110), and so on. In addition, model checker module 160 can be instructed to continue executing thread schedules that fall outside of the range or a specific context switch maximum value. For example, upon completion of all such thread schedules, and though a context switch maximum value might be set to "3," model checker module 160 can process the first few steps of all remaining thread schedules up until reaching the prescribed context switch limit (i.e., "c").

For example, model checker module 160 might execute the threads of thread schedule 110 through context switches 111 and 112, and then stop execution, even though thread schedule 110 may have as many as four other possible context switches (e.g., 111, 112, 114, 118). Similarly, model checker module 160 could process all remaining thread schedules for a prescribed amount of time, or until some other termination value has been reached, even after processing those thread schedules that are determined to fit within the prescribed context switch maximum value. In each case, however, module checker module 160 produces error report 170, which contains all possible errors for all possible states encountered for thread schedules within the prescribed context switch maximum value.

Example 1 and the corresponding discussion that follows illustrates or describes at least one possible iterative context switch processing algorithm. As understood more fully below, the described algorithm systematically searches the state space of a program by iteratively increasing the number of preempting context switch values, and correspondingly executing threads within thread schedules that match or fall within those context switch values.

Example 1

Iterative Context Bounding Algorithm

Input: initial state $s_0$ e State and context switch bound csb

```
1   struct WorkItem { State state; Tid tid; }
2   Queue<WorkItem> workQueue;
3   Queue<WorkItem> nextWorkQueue;
4   WorkItem w;
5   int currBound=0;
6   for t e enabled (s_0) do
7       workQueue.Add(WorkItem (s_0, t));
8   end
9   while true do
10      while ¬workQueue.Empty( ) do
11          w := workQueue.Front( );
12          workQueue.Pop( );
13          Search(w);
14      end
15      if nextWorkQueue.Empty( ) then
16          Exit( );
17      end
18      currBound:= currBound+ 1;
19      workQueue:= nextWorkQueue;
20      nextWorkQueue.Clear( );
21  end
22  Search(WorkItem w) begin
23      WorkItem x;
24      State s;
25      s := w.state.Execute(w.tid);
26      if w.tid 2 enabled(s) then
27          x :=WorkItem(s,w.tid);
28          Search(x);
29              for t e enabled(s) \ {w.tid} do
30                  x := WorkItem(s, t);
31                  nextWorkQueue.Push(x);
32              end
33      else
34          for t 2 enabled(s) do
35              x := WorkItem(s, t);
36              Search(x);
37          end
38      end
39  end
```

As shown in the above code of Example 1, this algorithm takes as input the initial state "$s_0$," and iteratively explores executions with increasing preemptions. In other words, for any "i≦0," the algorithm explores every execution with "i" preemptions before exploring any execution with "i+1" preemptions. In at least one implementation, this algorithm of Example 1 can be modified to stop when a particular preemption bound is reached.

In at least one implementation, the algorithm of Example 1 can be configured to maintain two queues of work items. In this example, each work item "w" contains a state and a thread identifier, and notifies the model checker (e.g., 160) to schedule the thread "w.tid" from the state "w.state." In addition, the variable "workQueue" contains work items that can be explored within the current preemption bound set in the variable "currBound." During this exploration, the model checker (e.g., 160) inserts work items requiring an extra preemption into "nextWorkQueue," postponing the processing of such work items after the exploration of the states within the current preemption bound.

In lines 6-8, "workQueue" is initialized with work items corresponding to the initial state. One work item is created for each thread enabled in the initial state. The loop in lines 10-14 removes a work item from the queue, and invokes the procedure "Search" thereon. Whenever control reaches line 15, the algorithm in this example is configured to guarantee that all executions with (at most) "currBound" preemptions have been executed. In lines 15-20, the algorithm continues the execution of work items in "nextWorkQueue," if any, after incrementing the "currBound."

The recursive procedure "Search" processes a work item "w," and recursively explores all states reachable without introducing any preemptions. In line 25, the procedure executes the thread "w.tid" in "w.state" until the next scheduling point. In order to explore every behavior of the program, it is necessary in at least one implementation to insert a scheduling point after each access to a shared variable. Essentially, doing so can cause a thread to execute at most one shared-variable access in every step.

If "w.tid" is enabled in the state "s" (line 26), the algorithm schedules "w.tid" for another step by calling "Search" recursively in line 28. At the same time, scheduling some other thread enabled in "s" results in a preemption of "w.tid." In lines 29-32, the algorithm creates a work item for every such thread and inserts the item in the "nextWorkQueue." If the thread "w.tid" is not enabled in "s," then "w.tid" voluntarily yielded control in "s." Therefore, the algorithm is free to schedule any enabled thread without incurring the cost of a preemption. The loop in lines 34-36 accomplishes this by creating a work item for every enabled thread in "s" and calling "Search" on each one.

In addition, the algorithm of Example 1 one can be used with or without state caching, which is generally orthogonal to the concept of context-bounding. The concept of state caching, however, can be easily added simply by introducing a global variable: "Set<State>table." This particular variable "table" can then be initialized to the empty set. In addition, the following code of Example 2 can also be added at the beginning of Search in order to prune the search if a state is revisited.

Example 2

Pruning the Search

```
if table.Contains(w.state) then
    return;
end
table.Add(w.state);
```

In general, there are a number of different ways to execute a set of given threads in any given thread schedule in order to test the thread execution. In at least one implementation, for example, each given thread of a thread schedule is assigned a semaphore value, which can be requested by model checker module 160 from the operating system when creating the thread. By default, the semaphore value is set to some threshold value, such as "0." The semaphore value can also be set to either increment or decrement, but never to fall below the particular threshold value. Thus, when model checker module 160 begins execution of a particular thread (e.g., 113), the semaphore value must be above the threshold value; and, moreover, that semaphore value is ultimately decremented at some point during execution, which causes a blocking action, and causes moving to another thread or thread schedule.

For example, when execution of one of the steps in thread 113 approaches a context switch that is preempting (e.g., 111 is preempting in this example), the model checker module 160 can increment the semaphore value of thread 115 to "1," and decrement the semaphore value of thread 113 so that thread 113 is "blocked" (e.g., to "0" or attempting to decrement below "0"). As a result, the model checker module 160 stops executing thread 113, and begins executing thread 115 until approaching some other context switch that might require switching to yet another thread (or back again to 113). The above-mentioned text, therefore, is at least one implementation in which model checker module can simulate execution of threads within all thread schedules.

In addition to the foregoing, depth-first searching can be used in accordance with one or more implementations of the present invention to ensure that the same thread is not executed twice, and thus avoid duplicative efforts. One will appreciate that the ability to avoid duplication is an inherent property of the depth-first search model. In any event, using a depth-first search model with respect to a state transition graph, model checker module 160 can arrange each thread schedule (e.g., 120, 130) in a work queue (e.g., 150). As such, each thread schedule (e.g., 110, 120, or 130) represents a "state" in the transition graph, while at least one thread in the thread schedule represents an "edge" between that thread schedule and another thread schedule.

Thus, model checker module 160 creates an execution stack based on each of the thread schedules in work queue 150. After arranging the execution stack, the model checker module 160 executes each thread of each thread schedule in turn, performing any context switches based, for example, on the use of semaphore values described above. As each thread is executed, the model checker module 160 then removes that particular thread from the execution stack until the stack is empty. Thus, no thread or thread schedule will remain in the execution stack after execution, and thus duplicate execution thereof is avoided. As such, execution of the execution stack mimics traversal of the transition graph, and thus ensures that threads and thread schedules are not executed more than once.

Figure 2:
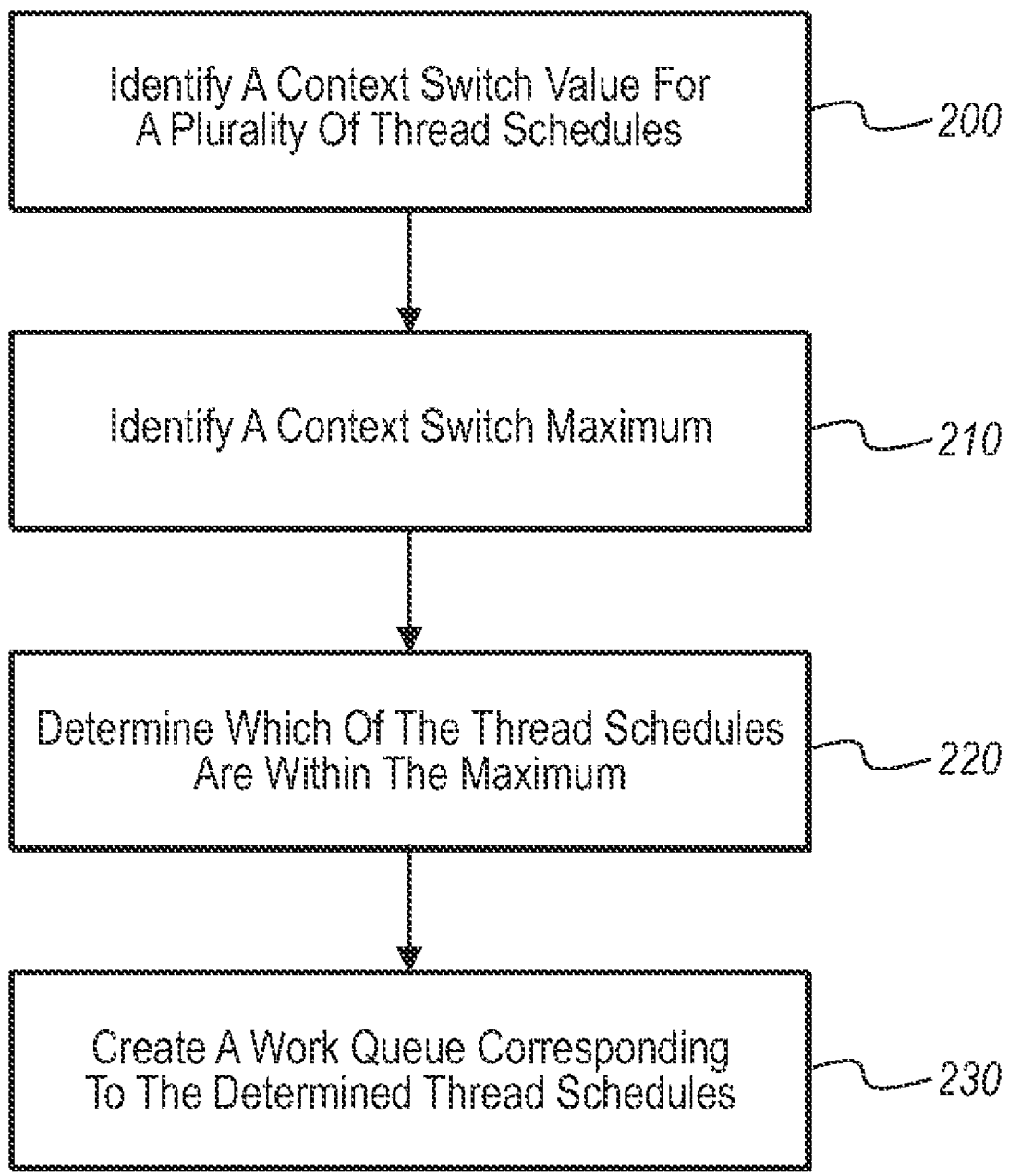
FIG. 2 illustrates a flowchart of a sequence of acts in a method in accordance with an implementation of the present invention for prioritizing thread schedules based on context switch values, and creating a corresponding work queue for testing purposes.
Figure 3:
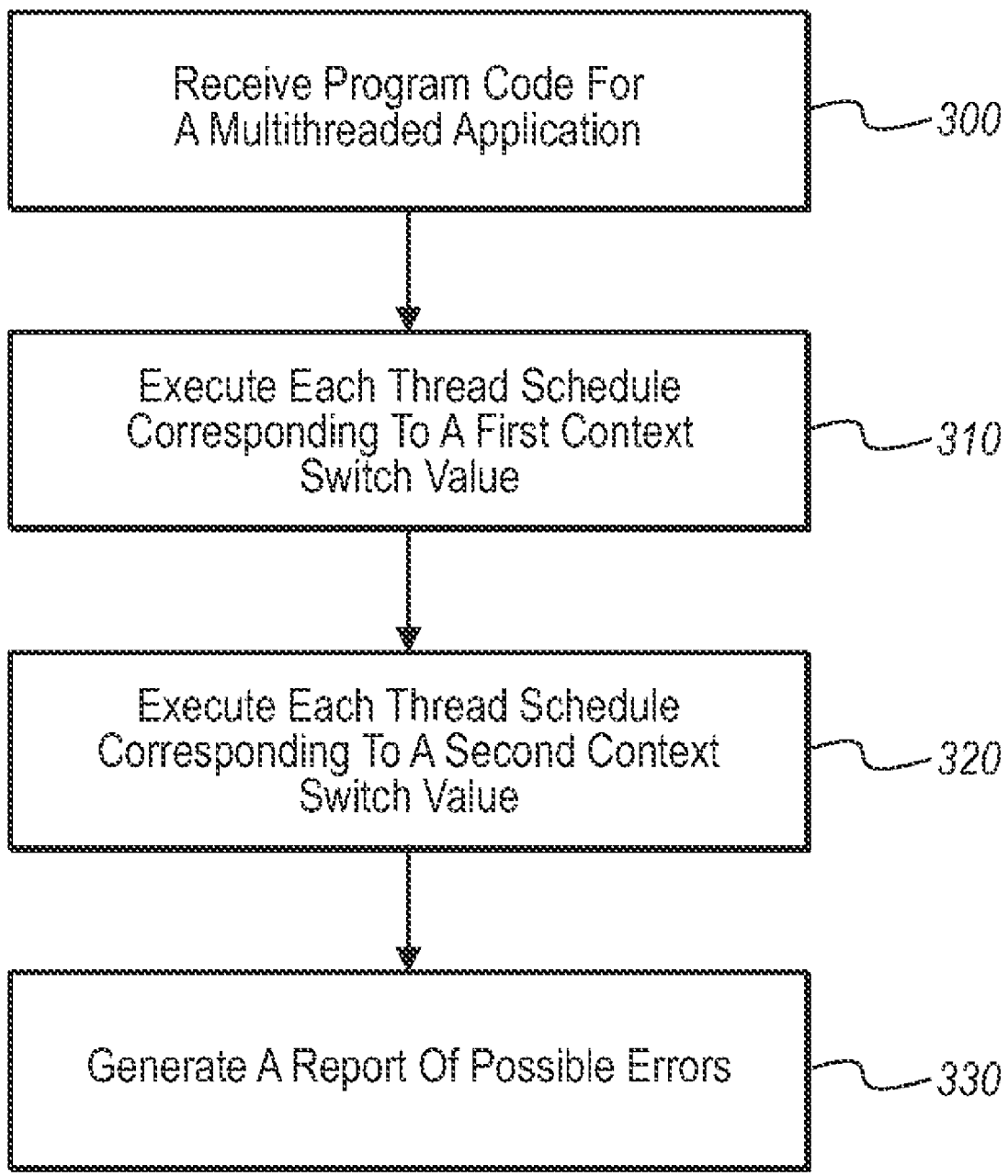
FIG. 3 illustrates a flowchart of a sequence of acts in a method in accordance with an implementation of the present invention for iteratively executing thread schedules corresponding to different context switch values, and generating a report of the possible errors.

Accordingly, FIG. 1 and Example 1 provide a number of different conceptual schematics, code, and specific descriptions for implementation one or more mechanisms or algorithms for context-bounded testing. In addition, implementations of the present invention can be described in terms of flowcharts comprising one or more acts for accomplishing a particular result. For example, FIGS. 2 and 3 illustrate different flowcharts for acts in methods of prioritizing and/or executing thread schedules based on context switch values. The acts of FIGS. 2-3 are described below with respect to the components and diagrams illustrated or described in FIG. 1.

For example, FIG. 2 shows that a method of testing a multithreaded application for errors at least with context switch bounding can comprise an act 200 of identifying a context switch value for a plurality of thread schedules. Act 200 includes identifying a context switch value for each of a plurality of thread schedules in a multithreaded application, wherein at least some of the plurality of thread schedules include at least some threads configured to execute concurrently. For example, prioritization module 145 scans each of thread schedules 110, 120, and 130 in application program 105 to determine the total number of context switches (preempting, and/or non-preempting, etc.) between threads (113, 115, 117, etc) for each thread schedule.

FIG. 2 also shows that the method can comprise an act 210 of identifying a context switch maximum. Act 210 can include identifying a context switch maximum value. For example, prioritization module 145 provides one or more interfaces to a tester, who then provides various values such as the type of context switches to limit or bound (e.g., preempting, non-preempting, or both), and a maximum number of context switches that should be allowed per thread schedule, or the like.

In addition, FIG. 2 shows that the method can comprise an act 220 of determining which of the thread schedules are within the maximum. Act 220 includes determining which of the identified context switch values corresponding to each of the plurality of thread schedules is within the identified context switch maximum value. For example, FIG. 1 shows that prioritization module 145 identifies or receives a maximum context switch value ("$c \leqq 3$") from the tester, indicating that only those thread schedules having three or fewer context switches between threads should be executed. With respect to FIG. 1, prioritization module 145 determines that only thread schedules 120 and 130 have context switch values that are less than or equal to three (3).

Furthermore, FIG. 2 shows that the method can comprise an act 230 of creating a work queue corresponding to the determined thread schedules. Act 230 includes creating a work queue comprising only those thread schedules corresponding to the determined context switch values within the context switch maximum value. For example, FIG. 1 shows that prioritization module 145 prepares work queue 150, which in this case includes all thread schedules having a context switch value of less than or equal to three (3). Of course, as previously described, work queue 150 can contain additional parameters or prioritizations. For example, work queue 150 can be further ordered so that thread schedules with a context switch value of zero are executed first (in any arbitrary or defined order), then those thread schedules with a context switch value of one (in any arbitrary or defined order), and so on. Similarly, work queue 150 can include parameters regarding additional depth-bounding.

In addition to the foregoing, FIG. 3 illustrates that an additional or alternative method of testing the multithreaded application for errors at least with context-bounding can comprise an act 300 of receiving program code for a multi-threaded application. Act 300 includes receiving a set of program code of a multithreaded application program, wherein the program code is closed. For example, a tester feeds non-compiled program code of application program 105 to prioritization module 145. In general, application program 105 will need to be "closed" before being processed by prioritization module 145. Being "closed," in turn, means that the tester provides all necessary inputs that will be used to process the application program 105 thread schedules.

FIG. 3 also shows that the method can comprise an act 310 of executing each thread schedule corresponding to a first context switch value. Act 310 includes executing each thread schedule in an initial set of one or more thread schedules that correspond to a first context switch maximum value (e.g., maximum of preempting, and/or non-preempting context switches), wherein each possible state for each thread schedule in the initial set is determined. For example, model checker module 160 receives a work queue of all thread schedules that have a context switch value equal to or less than three, and begins processing thereof. Alternatively, model checker module 160 receives (or executes) only those thread schedules (in any arbitrary or defined order) that have an initial context switch value (e.g., 0), which will be iteratively increased up to some maximum (e.g., 3).

Thus, in addition to act 310, FIG. 3 shows that the method can comprise an act 320 of executing each thread schedule corresponding to a second context switch value. Act 320 includes, upon completing execution of each thread schedule in the initial set, executing each thread schedule in a subsequent set of one or more thread schedules that correspond to a second context switch maximum value, wherein each possible state for each thread schedule in the initial set is determined. For example, after completing execution of the entire sets of thread schedules in work queue 150, prioritization module 145 prepares and sends a new work queue (not shown) to model checker module 160, which contains those thread schedules meeting a new, higher context switch value. Alternatively, model checker 160 simply starts executing all those thread schedules in the work queue 150 that have context switch values greater than some initial value (e.g., 0), but otherwise less than or equal to the maximum context switch value (e.g., 1, 2, or 3).

Furthermore, FIG. 3 shows that the method can comprise an act 330 of generating a report of possible errors. Act 330 includes generating at least one error report that correlates all possible errors within one or both of the first or second context switch maximum values. For example, and as previously described, FIG. 1 shows that model checker module checker module 160 generates error report 170. Error report 170 includes all errors discovered through executing all threads of the thread schedules within the context switch parameters (as well, in some cases, as depth bounds, etc.) in the provided schedule or work queue.

Accordingly, one will appreciate that the above-described schematics, code, and methods can provide a number of different advantages. For example, many subtle bugs can be found in executions limited to thread schedules with relatively few preempting context switches. In particular, most states of interest can be covered with executing thread schedules having relatively few preempting context switches. The following test data illustrate this.

The above-described algorithms (e.g., Example 1) were evaluated compared with a set of benchmark programs. Each program used in the test was an open library, requiring a test driver to close the system. The test driver allocated threads that concurrently called particular sequences of library functions with appropriate inputs. The input program, together with the test driver, formed a closed system that was given to the model checker (e.g., 160) for systematically exploring the behaviors. For experimentation purposes, it was assumed that the only non-determinism in the input program and the test driver was that which was induced by the scheduler, which the model checker controlled. The programs against which the algorithm(s) was/were tested are as follows.

TABLE 1

Characteristics of the Benchmark Programs

| Programs | LOC | Num Threads | Max K | Max B | Max c |
|---|---|---|---|---|---|
| Bluetooth | 400 | 3 | 15 | 2 | 8 |
| File System Model | 84 | 4 | 20 | 8 | 13 |
| Work Stealing Q | 1266 | 3 | 99 | 2 | 35 |
| APE | 18947 | 4 | 247 | 2 | 75 |
| Dryad Channels | 16036 | 5 | 273 | 4 | 167 |

With respect to Table 1, the "Bluetooth" program was a sample Bluetooth "Plug and Play" (PnP) driver that was modified to run as a library in "user" space. The sample driver did not contain hardware-specific code, but captured the synchronization and logic required for basic PnP functionality.

The "File System Model" was a program configured to emulate processes of creating files, and thereby allocating "inodes" and "blocks." Each inode and block, in turn, was protected by a lock.

The "Work-Stealing Q" program was constructed with a queue of work items implemented using a bounded circular buffer. In this case, the constructed test driver comprised two threads: a "victim" thread and a "thief" thread, both of which concurrently accessed the queue. The victim thread was configured to push work items to—and release or pull the work items from—the tail of the queue. By contrast, the thief thread was configured to steal work items from the head of the queue.

"APE" (Asynchronous Processing Environment) was a program that included a set of data structures and functions that provided logical structure and debugging support to asynchronous multithreaded code. In the test, the main thread initialized APE's data structures, created two worker threads, and waited for the structures and threads to finish. The worker threads concurrently exercised certain parts of the interface provided by APE.

The "Dryad Channels" application represented a distributed execution engine for coarse-grained data-parallel applications. In general, a Dryad application combines computational "vertices" with communication "channels" to form a data-flow graph. The Dryad application used in this test was executed on a set of available processors, and communicated as appropriate through files, TCP pipes, and shared-memory FIFOS (File-In, File-Out). The test against the Dryad application had five threads, and exercised the shared-memory channel library used for communication between the nodes in the data-flow graph.

In addition to the above, a "Transactionmanager" program provided transactions in a system for authoring web services on the MICROSOFT .NET platform. Internally, the in-flight transactions were stored in a hash table, access to which was synchronized using fine-grained locking. Each test contained two threads: one thread performing an operation (create, commit, or delete) on a transaction, while a second thread was a timer thread that periodically flushed from the hash table all pending transactions that had timed out.

The iterative context-bounding algorithm of Example 1 was then tested in comparison with the above-mentioned programs, with results as shown in Table 2 below.

TABLE 2

Errors Found with Context Switch Limits

| Programs | Total Bugs | Context Switch Value | | | |
|---|---|---|---|---|---|
| | | 0 | 1 | 2 | 3 |
| Bluetooth | 1 | 0 | 1 | 0 | 0 |
| File System Model | 3 | 0 | 1 | 2 | 0 |
| Work Stealing Q | 3 | 0 | 0 | 2 | 1 |
| APE | 4 | 2 | 1 | 1 | 0 |
| Dryad Channels | 3 | 1 | 2 | 0 | 0 |

For the first three programs, namely Bluetooth, Work-Stealing Q, and the transaction manager, the algorithm in accordance with implementations of the present invention (e.g., Example 1) introduced seven known concurrency bugs that were considered to be subtle concurrency errors. The iterative context bounding algorithm was able to find all such errors within a bound ("c") of three. When compared against the APE and Dryad programs, the algorithm also discovered a total of seven previously unknown concurrency errors, at least one of which could not be found by a depth-first search with respect to the Dryad Channels, even after running for a couple of hours.

With particular respect to the Dryad Channels comparison, for example, at least one of the three errors was found simply by setting the context switch maximum value to 1. By contrast, a depth-first search was flooded with an unbounded number of preempting context switches, and was thus unable to expose the error within reasonable time limits. Accordingly, the above-illustrated/described text shows that limiting testing to threads schedules with relatively small context-switch maximum values can provide significant state coverage, and can even identify bugs not otherwise discoverable using conventional testing techniques.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

Computer-readable media may be divided into two separate categories: computer storage media and communication media. Computer storage media include RAM, ROM, EEPROM, CD-ROM or other optical disk storage, magnetic disk storage or other magnetic storage devices, but do not include signals. Communication media include signals and the media that carry the signals. For example, when information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, performed by a computer system, for testing a multi-threaded computer program, the method comprising:

receiving a context-switch bound (csb) that specifies a number of preempting context switches;

repeatedly executing the computer program in a multi-threading environment from an initial state to reach all possible states of execution of the computer program that are reachable from the initial state with at most csb preempting context switches;

for each state that is reachable from the initial state with the number of preempting context switches specified by the csb, storing the state and ceasing the corresponding execution of the computer program;

after repeatedly executing the computer program from the initial state to reach all possible states that are reachable from the initial state with at most csb preempting context switches, repeatedly executing the computer program from each stored state to reach all possible states of execution of the computer program that are reachable from each stored state with at most csb preempting context switches; and for any error detected during the repeated execution of the computer program, notifying a user of the error.

2. The method of claim 1, wherein each thread of the computer program is organized in a work item that also includes a state from which execution of the work item will commence.

3. The method of claim 2, further comprising:
adding the work item for each thread that is enabled from the initial state to a first queue.

4. The method of claim 3, wherein repeatedly executing the computer program from the initial state comprises executing each work item stored in the first queue.

5. The method of claim 4, further comprising:
determining during execution of a first work item that the state reached was already reached by a different work item; and
canceling the execution of the first work item.

6. The method of claim 2, further comprising:
determining during execution of each work item that the number of preempting context switches that have occurred during execution of the work item equals csb, and storing the work item in a second queue including the state of execution of the work item at the time of the last preempting context switch.

7. The method of claim 6, wherein the first and second queues are the same.

8. The method of claim 1, wherein notifying a user of the error comprises identifying whether the error occurred during repeated execution from the initial or the stored state.

9. One or more computer storage media storing computer executable instructions which when executed by a process perform a method for testing a multi-threaded computer program, the method comprising:

receiving a context-switch bound (csb) that specifies a number of preempting context switches;

repeatedly executing the computer program in a multi-threading environment from an initial state to reach all possible states of execution of the computer program that are reachable from the initial state with at most csb preempting context switches;

for each state that is reachable from the initial state with the number of preempting context switches specified by the csb, storing the state and ceasing the corresponding execution of the computer program;

after repeatedly executing the computer program from the initial state to reach all possible states that are reachable from the initial state with at most csb preempting context switches, repeatedly executing the computer program from each stored state to reach all possible states of execution of the computer program that are reachable from each stored state with at most csb preempting context switches; and for any error detected during the repeated execution of the computer program, notifying a user of the error.

10. The computer storage media of claim 9, wherein each thread of the computer program is organized in a work item that also includes a state from which execution of the work item will commence.

11. The computer storage media of claim 10, further comprising:
adding the work item for each thread that is enabled from the initial state to a first queue.

12. The computer storage media of claim 11, wherein repeatedly executing the computer program from the initial state comprises executing each work item stored in the first queue.

13. The computer storage media of claim 12, further comprising:
determining during execution of a first work item that the state reached was already reached by a different work item; and
canceling the execution of the first work item.

14. The computer storage media of claim 10, further comprising:
determining during execution of each work item that the number of preempting context switches that have occurred during execution of the work item equals csb, and storing the work item in a second queue including the state of execution of the work item at the time of the last preempting context switch.

15. The computer storage media of claim 14, wherein the first and second queues are the same.

16. The computer storage media of claim 9, wherein notifying a user of the error comprises identifying whether the error occurred during repeated execution from the initial or the stored state.

17. A system comprising:
a process; and
memory storing computer executable instructions which when executed by the process perform a method for testing a multi-threaded computer program, the method comprising:
receiving a context-switch bound (csb) that specifies a number of preempting context switches;
repeatedly executing the computer program in a multi-threading environment from an initial state to reach all possible states of execution of the computer program that are reachable from the initial state with at most csb preempting context switches;
for each state that is reachable from the initial state with the number of preempting context switches specified by the csb, storing the state and ceasing the corresponding execution of the computer program;
after repeatedly executing the computer program from the initial state to reach all possible states that are reachable from the initial state with at most csb preempting context switches, repeatedly executing the computer program from each stored state to reach all possible states of execution of the computer program that are reachable from each stored state with at most csb preempting context switches; and
for any error detected during the repeated execution of the computer program, notifying a user of the error.

* * * * *